Patented Feb. 13, 1945

2,369,468

UNITED STATES PATENT OFFICE 2,369,468

COMPOSITE TITANIUM DIOXIDE PIGMENTS AND METHODS FOR MAKING THE SAME

Franklin L. Kingsbury, Rumson, and Sandford S. Cole, Metuchen, N. J., and William B. Anderson, Brooklyn, N. Y., assignors to National Lead Company, New York, N. Y., a corporation of New Jersey No Drawing. Application January 7, 1942, Serial No. 425,852

22 Claims. (Cl. 106—300)

This invention relates to pigments comprising or consisting of rutile titanium dioxide. It has particular reference to composite titanium pigments containing rutile titanium dioxide and possessing high tinting strength and/or enhanced chalk resistance.

An object of the present invention is the preparation of pigments comprising or consisting of rutile titanium dioxide. Another object of the invention is the preparation of composite titanium dioxide pigments having increased tinting strength. Another object of the invention is the preparation of composite titanium dioxide pigments possessing improved chalk resistance. These and other objects of the invention will be readily apparent from the description.

By the term "composite titanium pigments" as herein employed is meant to include pigmentary compositions comprising two or more constituents one of which is titanium dioxide. Examples of such pigments are those in which titanium dioxide is intimately associated with calcium sulfate, barium sulfate, magnesium silicate, a mixture of zinc sulfide and barium sulfate (referred to in the trade as "titanated lithopone"), and the like.

Pigmentary titanium dioxide is produced commercially at the present time by heat-treating (calcining) hydrous titanium oxide obtained by hydrolytic precipitation from titanium sulfate solutions. Upon calcination under such conditions as to produce a pigmentary product, the hydrous titanium oxide which has been precipitated from titanium sulfate solutions assumes the anatase crystalline modification. Upon further calcination at temperatures generally higher than those employed to develop pigment properties anatase titanium dioxide is converted into rutile titanium dioxide; however, with serious impartment of its pigmentary properties. This conversion may be hastened and accomplished at normal pigment calcining temperatures, if there be admixed with the anatase during the heating small amounts of certain converting agents. For example, U. S. Patent No. 2,290,539, issued July 21, 1942, to one of us, describes the conversion of anatase to rutile using as converting agents compounds having spinel, corundum, ilmenite, phenacite, or sodium chloride crystalline characteristics. Such agents, which as pointed out in the said application should not volatilize, liquefy, or decompose at the temperature of the conversion, include zinc titanate and zinc stannate as representative of the spinel group, magnesium metatitanate as representative of the ilmenite-corundum group, lithium titanate as representative of the sodium chloride group, and zinc silicate as representative of the phenacite group. Where the converting agent is a titanate the basic metal oxide, for instance, zinc oxide, magnesium oxide, or lithium oxide or compounds of these metals which on heating yield the oxide, may be used directly and the converting titanate formed in situ.

The anatase modification possesses a refractive index of 2.55 as compared with 2.72 for the rutile modification and since the tinting strength of the ultimate pigment depends in a large measure upon its refractive index it would naturally be expected, all other factors, such as particle size, particle size distribution, etc., being equal, that pigmentary rutile titanium dioxide would possess a higher tinting strength than anatase titanium dioxide. Steady improvement in the production of anatase titanium dioxide has resulted in pigments having tinting strength of about 1250 which is close to the maximum theoretically possible for anatase. (Wherever tinting strength values are given in this description they are based upon the so-called "Reynolds method" for determining tinting strength as described in Physical and Chemical Examination of Paints, Varnishes, Lacquers, and Colors, by H. A. Gardner, ninth edition, May 1939, page 37). Theoretical considerations capable of experimental verification indicate that rutile titanium dioxide should possess a tinting strength of about 1600. However, it has not been possible heretofore to realize the expected high tinting strength when preparing rutile by conversion of anatase titanium dioxide. When converting anatase to rutile without resort to a converting agent, it is utterly impossible to produce a product acceptable for use as a pigment. Because of the protracted heat-treatment required, excessive grain growth occurs and due to sintering and agglomeration of the TiO$_2$ particles, the product becomes hard and gritty, exceedingly discolored, the tinting strength and the brightness drops even below that of anatase. When using a converting agent which shortens the time required for conversion, it is possible to produce a pigment which is commercially acceptable for certain purposes. Nevertheless, even in this case sintering and agglomeration occurs and it has not been found possible to attain the expected tinting strength of rutile; at the same time, the color and brightness of such pigments also leaves something to be desired. By means of the present invention it is possible to obtain rutile titanium pigments having tinting strengths approximating the theoretical value for rutile.

According to the invention, hydrous titanium oxide is precipitated from a titanium sulfate solution upon an extender, or other pigmentary material, suspended therein. The resulting co-precipitated mixture of hydrous titanium oxide and extender is then calcined under certain conditions hereinafter to be described to obtain, as desired, a coalesced composite pigment having maximum tinting strength as would be expected from rutile, or one having high resistance to chalking. By the term "co-precipitated mixture" as used herein is meant a mixture obtained by hydrolytically precipitating hydrous titanium oxide from an ilmenite solution upon particles of extender pigments contained in suspension in said solution. Also, according to this invention, pure titanium dioxide pigment which is substantially equal in brightness and color to the best commercial anatase pigment and possessing a tinting strength approximating the maximum theoretical for rutile may be obtained by employing a water-soluble extender pigment, e. g., calcium sulfate, and, after calcination washing the resulting composite pigment substantially free from this constituent.

The co-precipitation of the hydrous titanium oxide upon the extender is essential to obtain the improved results of the invention. When starting with a mechanical mixture of hydrous titanium oxide and extender as also when starting with a mixture of calcined anatase titanium dioxide and extender, products having inferior tinting strength are obtained. Apparently, as a result of the co-precipitation of hydrous titanium oxide and extender, the particles of each are so intimately and evenly intermixed thus effectively separating the titanium dioxide particles, that the sintering and agglomeration which is so detrimental to tinting strength and which would normally occur if any considerable number of titanium dioxide particles were in contact with each other are prevented.

The nature of the extender, and the type of impurities it may contain is of considerable importance in the practice of the invention. The extender must not itself fuse or sinter at the temperature of the heat-treatment; it must not act as a flux to promote sintering of the titanium dioxide particles, and it must be free from impurities which would act as fluxes to promote sintering of either the extender particles or of the titanium dioxide particles. When a composite titanium dioxide-calcium sulfate pigment is to be prepared according to the invention, it is preferable to employ a synthetic calcium sulfate. Thus, a calcium sulfate especially suitable for use in the present invention is one obtained by adding a lime slurry to concentrated sulfuric acid, controlling the concentrations of lime slurry and of sulfuric acid, temperature, and method of adding the lime slurry to the sulfuric acid in such manner as to obtain anhydrite. When a composite titanium dioxide-barium sulfate pigment is to be prepared, it is preferable to prepare the blanc fixe in such manner as will produce a material free from fluxing impurities. Thus, among other methods, barium chloride or barium carbonate may be reacted with sulfuric acid to yield a suitable material.

Provided the extender meets the afore-mentioned conditions, the co-precipitation may be carried out by adding the desired amount of extender to a titanium sulfate solution prior to hydrolysis and then initiating the hydrolysis by heating the mixture to obtain the composite precipitate of hydrous titanium oxide and extender. After the composite precipitate is washed in the customary manner a converting agent as described in the aforementioned Patent No. 2,290,539, is incorporated therewith and the mixture subjected to calcination. The amount of converting agent, which has to be used is only small, being between about 0.1% and 5.0% based on the weight of the titanium dioxide present; usually about 1% of zinc oxide based on the weight of the composite precipitate gives good results.

According to the invention, the duration and intensity of the calcination is controlled to produce, as may be desired, a pigment having maximum tinting strength, or high chalk resistance, or an optimum combination of both properties. We have observed that during the calcination tinting strength increases to a maximum value from whence, upon further calcination it progressively decreases. Simultaneous with the decrease in tinting strength which results from prolonged calcination other pigmentary properties, e. g. texture, brightness and color are adversely affected while, on the contrary, resistance to chalking continues to increase. Therefore, in order to obtain the high tinting strength pigment, which is a primary object of the invention, the calcination is stopped before the curve of tinting strength development (as plotted against time of calcination at a selected temperature) begins to drop. When a pigment having high resistance to chalking is desired the calcination is continued to obtain the highest chalk resistance consistent with the preservation of other essential pigment properties.

When practicing the invention, certain considerations with respect to the control of the calcination should be borne in mind. The transition from the high tinting strength product of the invention to the high chalk resistance product is a gradual one which takes place at the calcination temperature and requires only a prolongation of the calcination period. Hence, it is possible, according to the invention to prepare both products from a single batch of starting material merely by withdrawing a portion thereof when the maximum tinting strength has been attained and to continue the calcination of the remaining portion until the high chalk resistant product is obtained. Conversely, the high chalk resistant product can be obtained within the same time of calcination employed for producing the high tinting strength product by merely increasing the temperature at which the calcination is conducted. It will, therefore, be seen that the factors of time and temperature of calcination are reciprocal and in choosing a suitable combination of these factors considerations of economy and practicability will largely govern the selection. Thus, when using converting agents the development of rutile titanium dioxide will proceed at temperatures as low as about 775° C. but the time required at this temperature to produce the products of the invention will be so long as to be impracticable for commercial purposes. Generally speaking temperatures above about 1100° C. should not be employed because of the sintering and agglomeration which occur at such elevated temperatures with consequent detriment to pigment properties. Thus, for practical purposes the temperature of calcination will lie within the range 850° C. to 1100° C., and preferably between about 925° C. and about 1050° C. Within these ranges the time of calcination may be readily determined by following the course of tinting strength development. For instance, small samples may be withdrawn periodically from the calciner and tested for tinting strength or, alternatively, the time can be fixed, a priori, from data resulting from small-scale test calcinations. The formation of rutile crystalline structure can be followed by X-ray examination. Within the range of practical calcination temperatures the suitable time of calcination will be found generally to be between about one-half hour and about six hours.

The improved results of the present invention will readily be appreciated by comparison of the products obtained with the composite pigments of the prior art. Thus, a prior art titanium dioxide-calcium sulfate composite pigment (30% titanium dioxide—70% calcium sulfate) in which the titanium dioxide is in the form of anatase, will have a tinting strength of about 460-470, a brightness of about 98% and when exposed to weathering at a 45° angle in a standard enamel vehicle, will exhibit chalking in about four weeks. ("Brightness" or "light reflectance" is discussed by H. A. Gardner, page 39 et seq. of "Physical and Chemical Examination of Paints, Varnishes and Lacquers" supra. The figures herein given are relative to standard magnesium oxide). A high tinting strength titanium dioxide—calcium sulfate pigment prepared according to the present invention will have a tinting strength of about 590-620; substantially equal brightness and under the same exposure conditions will exhibit at least a 25% and generally between 50% and 100% increase in chalk resistance. A titanium dioxide-calcium sulfate pigment prepared according to the present invention having a high chalk resistance will have a tinting strength of about 540-560, a dry brightness of about 97.5 and at least a 250% and generally between 500% and 1000% increase in chalk resistance. For example, as regards chalking, where a standard anatase type composite calcium sulfate pigment will exhibit chalking in about four weeks, the high tinting strength rutile composite pigment of the present invention will not exhibit chalking under five weeks, and in fact generally not under about 6-8 weeks, whereas the high chalk resistant pigment of the present invention will not show any degree of chalking under ten weeks exposure and generally not under about 20 weeks. It will be understood, as explained above, that by control of time and temperature of calcination, the tinting strength and chalk resistance may be varied in relation to each other, as desired.

It will be noted that the high chalk resistant composite pigments prepared according to the present invention have somewhat lower tinting strength and slightly lower brightness than the high tinting strength pigments prepared according to the invention. In both the high tinting strength and high chalk resistant products the crystalline structure of the titanium dioxide constituents will be substantially that of rutile. From the tinting strength values of the products obtained, it will be seen that according to the invention the anticipated high tinting strength of rutile is attained and that the increase in tinting strength resulting from the presence of the extender (so-called "extension phenomena") is also preserved. The so-called "extension phenomena" results from the intimacy of admixture of particles of extender and titanium dioxide. Thus, in 30% titanium dioxide (anatase tinting strength=about 1200) and 70% calcium sulfate (tinting strength=0) the expected tinting strength of the mixture would be about 360 but is found actually to be about 460. When the titanium dioxide is present in the rutile crystalline modification (tinting strength=about 1600) the expected tinting strength of a similar mixture would be about 480, whereas it is actually found to be about 600.

According to the invention, pure titanium dioxide pigments may be prepared by using a rutile composite titanium dioxide-calcium sulfate pigment prepared as above described and washing the same until substantially free from calcium sulfate. When starting with a high tinting strength composite titanium dioxide pigment prepared according to the invention, the resulting rutile titanium dioxide will possess a higher tinting strength but somewhat less resistance to chalking than when starting with a high chalk resistant composite titanium dioxide pigment. Thus, according to the invention, and depending upon the use for which the pigment is intended, it is possible to prepare rutile titanium dioxide pigments the tinting strength and chalk resistance of which may vary as desired.

A similar increase in tinting strength and/or chalk resistance is obtained according to the invention when the extender employed is barium sulfate. Thus, a composite titanium dioxide-barium sulfate pigment containing 30% anatase titanium dioxide and 70% blanc fixe will have a tinting strength of about 430-440. Its chalk resistance may be rated at about 6 weeks. A pigment prepared according to the present invention containing an equal amount of titanium dioxide as rutile will have a tinting strength of about 550-570 and will show an increase in chalk resistance not under about one and one-half times.

The invention may be utilized to produce composite titanium dioxide pigments containing varying amounts of titanium dioxide within a considerable range of proportions. It has been found, however, that when the percentage of titanium dioxide goes beyond about 50% the effect of the separation of the titanium dioxide particles by the particles of extender diminishes the tendency toward sintering and agglomeration with consequent detriment to pigment properties is observed. Conversely, when the content of titanium dioxide falls much below about 10% the improved results of the invention diminish. Generally speaking, therefore, the invention, although not specifically limited thereto, is particularly adapted for the preparation of composite pigments containing between about 10% and about 50% titanium dioxide. As with the selection of the suitable time and temperature of calcination, there is considerable choice in the determination of the content of titanium dioxide to be present in the products of the invention. The final choice will be made in view of economic and manufacturing considerations and to meet the demands of the trade. At the present time composite titanium dioxide pigments containing about 25% and about 30% titanium dioxide have a wide marketability. For practical purposes, therefore, the invention can most suitably be employed for the production of composite pigments containing between about 25% and 35% titanium dioxide.

The following examples will illustrate, but not limit, the invention.

EXAMPLE I

*Preparation of hight tinting strength titanium dioxide-calcium sulfate pigment*

Lime slurry containing about 17 percent lime, calculated at CaO, was rapidly run into a 60° Bé. sulfuric acid. The amount of lime slurry and sulfuric acid were calculated to leave an excess of about 10 percent to 15 percent $H_2SO_4$ in the mother liquor. The addition of the lime slurry was carried out rapidly in order to conserve the heat of reaction and heat of dilution of the sulfuric acid thereby to form anhydrite calcium sulfate.

A sulfuric acid solution of ilmenite containing about 150 g. $TiO_2$ per liter was added to the anhydrite and the mixture heated to boiling in order to precipitate a composite hydrous titanium oxide-calcium sulfate pulp. The quantity of anhydrite and ilmenite solution employed were calculated to yield a precipitate containing after washing about 30 percent titanium dioxide, calculated as $TiO_2$, and about 70 percent calcium sulfate.

The composite pigment pulp was washed. About 1 percent of zinc oxide was intimately admixed with the pulp and the mixture calcined for about 2 hours at about 950° C.

EXAMPLE II

*Preparation of high chalk resistant titanium dioxide-calcium sulfate pigment*

A composite co-precipitated hydrous titanium oxide-calcium sulfate pigment pulp was prepared as described in Example I and using also 1 percent of zinc oxide calcined for about 2 hours at about 975° C.

After milling, the properties of the products from Examples I and II, compared to a prior art composite pigment co-precipitated exactly as in Example I were as follows:

|  | Prior art pigment | Product of Example I | Product of Example II |
| --- | --- | --- | --- |
| Percent $TiO_2$ (approx.) | 30 | 30 | 30 |
| Crystalline structure $TiO_2$ | Anatase | Rutile | Rutile |
| Refractive index | 1.87 | 1.98 | 1.98 |
| Specific gravity | 3.13 | 3.25 | 3.25 |
| Dry brightness, percent | About 98 | About 97.5 | 96-97 |
| Relative tinting strength | 470 | 590-620 | 540-560 |
| Relative chalking, percent [1] | 20 | 30-40 | 100 |

[1] Taking the chalk resistance of the product of Example II as 100%.

EXAMPLE III

*Preparation of high tinting strength titanium dioxide-barium sulfate pigment*

Blanc fixe was prepared by dissolving barium chloride, $BaCl_2 \cdot 2H_2O$, in water and adding to this solution a slight excess of 78% sulfuric acid and thereafter washing the precipitated barium sulfate.

The blanc fixe as above prepared was then mixed with a hydrolyzable titanium sulfate solution. The quantity of barium chloride and titanium sulfate solution was such as to yield after thermal hydrolysis, a composite precipitate containing about 30% hydrous titanium oxide, calculated as $TiO_2$, and the remainder blanc fixe. The precipitate was washed. Thereafter it was intimately incorporated with a zinc titanate composition prepared by heating 1 mol of zinc oxide with 1 mol titanium dioxide at a temperature of about 750° C. until all the titanium had been combined (chemically and as solid solution). The amount of this zinc titanate composition was equivalent to about 1% ZnO, based on the weight of the composite precipitate. The mixture was then calcined for about one hour at a temperature of about 975° C.

EXAMPLE IV

*Preparation of a high chalk resistant titanium dioxide-barium sulfate pigment*

A composite co-precipitated hydrous titanium oxide-barium sulfate pigment was prepared as described in Example III and, using also a zinc titanate composition prepared and in the same amount as described in Example III, calcined for about three hours at about 1000° C.

The following table compares the products obtained according to Examples III and IV with a prior art titanium dioxide-barium sulfate pigment.

|  | Prior art pigment | Product of Example III | Product of Example IV |
| --- | --- | --- | --- |
| Percent $TiO_2$ (approx.) | 30 | 30 | 30 |
| Crystalline structure $TiO_2$ | Anatase | Rutile | Rutile |
| Dry brightness | 98.5 | About 97-98 | About 96-97 |
| Relative tinting strength | 440 | 570 | 520 |
| Relative chalk resistance, percent [1] | 20-25 | 80 | 100 |

[1] Taking the chalk resistance of the product of Example IV as 100%.

EXAMPLE V

*Preparation of pigmentary rutile titanium dioxide from high tinting strength titanium dioxide-calcium sulfate pigment*

A high tinting strength composite titanium dioxide-calcium sulfate pigment prepared as described in Example I, and consisting about 30 percent of titanium dioxide and about 70 percent calcium having a tinting strength value of about 590 was washed with water until substantially all the calcium sulfate had been eliminated, leaving a product consisting of about 98.5 percent titanium dioxide.

EXAMPLE VI

*Preparation of pigmentary rutile titanium dioxide from high chalk resistant titanium dioxide-calcium sulfate pigment*

The procedure of Example V was repeated but instead of using a high tinting strength titanium dioxide-calcium sulfate pigment prepared according to Example I, in this example a high chalk resistant titanium dioxide-calcium sulfate pigment prepared as described in Example II and having a tinting strength of about 540 was employed as the starting material.

The products obtained according to Examples V and VI were tested for tinting strength, chalk resistance and brightness and gave the following values:

|  | Product of Example I | Product of Example V | Product of Example II | Product of Example VI |
| --- | --- | --- | --- | --- |
| Percent $TiO_2$ (approx.) | 30 | 98.5 | 30 | 98.5 |
| Crystalline structure $TiO_2$ | Rutile | Rutile | Rutile | Rutile |
| Dry brightness | About 95.5 | About 95 | About 95 | About 94 |
| Relative tinting strength | 590 | 1650 | 540 | 1500 |
| Relative chalk resistance, percent [1] | About 50 | About 50 | 100 | 100 |

[1] Taking the chalk resistance of the product of Example II as 100%.

Composite pigments containing rutile titanium dioxide and possessing a tinting strength commensurate with this crystalline modification are obtainable only when preparing the composite pigment by a co-precipitation of hydrous titanium oxide and extender, in accordance with the methods of the present invention. The product possessing the expected tinting strength of rutile titanium dioxide cannot be obtained either by mechanically blending a previously prepared anatase titanium dioxide with extender and then converting the anatase to rutile, or by mixing hydrous titanium oxide with an extender pigment and converting agent and heating the mixture to convert the hydrous titanium oxide to rutile titanium dioxide.

Products obtained by dry-blending rutile titanium dioxide prepared by recalcining previously prepared anatase titanium dioxide in admixture with a small amount of zinc oxide with dry previously prepared calcium sulfate anhydrite give tinting strength values for a 30% $TiO_2$-70% $CaSO_4$ mixture in the order of about 300; when anatase hydrous titanium oxide is mixed wet with freshly precipitated anhydrite calcium sulfate pulp in the same proportions and calcined in admixture with a small amount of zinc oxide to convert the hydrous titanium oxide to rutile titanium dioxide, the tinting strength values obtained are in the order of about 280. When a previously prepared anatase titanium dioxide pigment is mixed wet with freshly precipitated anhydrite calcium sulfate pulp in the same proportion and the mixture recalcined in admixture with a small amount of zinc oxide to convert the anatase to rutile titanium dioxide, the tinting strength values obtained are in the order of about 375. These values compare with tinting strengths of about 470 for the commercial standard anatase-containing composite calcium sulfate pigment, and about 590–620 for the high tinting strength products of the present invention, and about 540–560 for the high chalk resistant products of the present invention.

Products obtained by blending anatase titanium dioxide with blanc fixe and then converting the anatase to rutile by calcining with a converting agent give tinting strength values for 30% $TiO_2$-70% $BaSO_4$ mixtures in the order of 300; when blanc fixe in the same proportion is mixed with hydrous titanium oxide and the mixture calcined with a converting agent to convert the hydrous titanium oxide to rutile, tinting strength values obtained are in the order of 330; when a previously prepared anatase titanium dioxide pigment is blended with blanc fixe and the mixture recalcined with a converting agent to convert the anatase to rutile, tinting strength values in the order of 310 are obtained. These values compare with tinting strengths of about 440 for the commercial standard anatase-containing composite barium sulfate pigment, and about 570 for the high tinting strength products of the present invention and about 520 for the high chalk resistant products of the present invention.

The present invention has been explained specifically with respect to the preparation of calcium sulfate and barium sulfate composite titanium dioxide pigments. It will be understood, however, that other extender materials may suitably be employed within the scope of the invention provided, as aforesaid, they do not themselves tend to fuse or sinter under the conditions of calcination; do not promote the sintering of either the extender or the titanium dioxide and do not contain impurities which fuse or tend to promote the sintering of the extender or the titanium dioxide. It will be understood that, depending upon the type of extender pigment, the impurities which are deleterious to the product may differ. Thus, for instance, with respect to the preparation of barium sulfate-titanium dioxide composite pigment, it is essential that the blanc fixe employed be substantially free from alkali metal salts. In general, it may be stated that the starting materials for calcination should be free from those agents which are known to promote sintering of the constituents of the composite pigment.

Furthermore, it is possible within the scope of the invention to suspend a mixture of extenders in the titanium sulfate solution and to precipitate hydrolytically upon this mixture hydrous titanium oxide and thereafter to convert the same to rutile titanium dioxide. Where, for example, hydrous titanium oxide is precipitated upon a mixture of barium sulfate and calcium sulfate and the resultant mixed precipitate further processed in accordance with the invention to convert the anatase to rutile titanium dioxide, the calcium sulfate may be eliminated by washing, leaving a residue of titanium dioxide-barium sulfate pigment possessing the expected tinting strength for rutile titanium dioxide and improved chalk resistance.

The products of the present invention, since they are formed by hydrolytic precipitation of hydrous titanium oxide upon the extender pigment particles followed by a conjoint calcination, belong to the so-called "coalesced" type of composite titanium dioxide pigments, as distinguished from composite pigments prepared by mechanical mixing, or blending methods. Compared with prior art composite titanium pigments, the products of the present invention possess higher tinting strength and greater resistance to chalking while retaining substantially unimpaired other pigment properties.

We claim:

1. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture until by X-ray examination the presence of a substantial amount of rutile titanium dioxide can be detected in the resultant pigment and the pigment properties thereof are improved.

2. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 775° C. and about 1100° C. until by X-ray examination the presence of a substantial amount of rutile titanium dioxide can be detected in the resultant pigment, and the tinting strength and chalk resistant properties thereof are improved.

3. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 850° C. and about 1050° C. for a period of time between about one-half hour and about six hours.

4. Method for the production of improved composite titanium dioxide pigments containing rutile titanium dioxide which comprises suspending particles of pigmentary calcium sulfate in a sulfuric acid solution of titanium, hydrolying the said titanium solution to obtain a mixed precipitate of hydrous titanium oxide and calcium sulfate, mixing with the said precipitate a small amount of an inorganic compound selected from the group consisting of compounds having spinel, ilmenite, corundum, sodium chloride and phenacite crystalline characteristics which does not decompose and is non-liquefiable and non-volatile at the temperature of the subsequent calcination, and calcining the mixture at temperatures between 775° C. and about 1100° C. until by X-ray examination the presence of a substantial amount of rutile titanium dioxide can be detected in the resultant pigment and the tinting strength and chalk resistant properties thereof are improved.

5. Method for the production of improved composite titanium dioxide pigments containing rutile titanium dioxide which comprises reacting an aqueous lime slurry with strong sulfuric acid to form anhydrite calcium sulfate, suspending the calcium sulfate thus formed in a sulfuric acid solution of titanium, hydrolyzing the said titanium solution to obtain a mixed precipitate of hydrous titanium oxide and calcium sulfate, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 850° C. and about 1050° C. for a period of time between about one-half hour and about six hours.

6. Method for the production of improved composite titanium dioxide pigments containing rutile titanium dioxide which comprises reacting an aqueous lime slurry with strong sulfuric acid to form anhydrite calcium sulfate, suspending the calcium sulfate thus formed in a sulfuric acid solution of titanium, hydrolyzing the said titanium solution to obtain mixed precipitate of hydrous titanium oxide and calcium sulfate, mixing with the said precipitate a small amount of zinc oxide, and calcining the mixture at temperatures between about 850° C. and about 1050° C. for a period of time between about one-half hour and about six hours.

7. Method for the production of improved composite titanium dioxide pigments containing rutile titanium dioxide which comprises reacting an aqueous lime slurry with strong sulfuric acid to form anhydrite calcium sulfate, suspending the calcium sulfate thus formed in a sulfuric acid solution of titanium, the proportions of calcium sulfate and titanium solution being such as to yield after calcination a pigment containing between about twenty-five percent and thirty-five percent titanium dioxide and the balance calcium sulfate, hydrolyzing the said titanium solution to obtain a mixed precipitate of hydrous titanium oxide and calcium sulfate, mixing with the said precipitate a small amount of zinc oxide, and calcining the mixture at temperatures between about 850° C. and about 1050° C. for a period of time between about one-half hour and about six hours.

8. Method for the production of improved composite titanium dioxide pigments containing rutile titanium dioxide which comprises suspending particles of pigmentary barium sulfate impurities in a sulfuric acid solution of titanium, hydrolyzing the said titanium solution to obtain a mixed precipitate of hydrous titanium oxide and barium sulfate, mixing with the said precipitate a small amount of an inorganic compound selected from the group consisting of compounds having spinel, ilmenite, corundum, sodium chloride and phenacite crystalline characteristics which does not decompose and is non-liquefiable and non-volatile at the temperature of the subsequent calcination, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

9. Method for the production of improved composite titanium dioxide pigments containing rutile titanium dioxide which comprises reacting an aqueous solution of a water-soluble barium salt with sulfuric acid to form barium sulfate, suspending the barium sulfate thus formed in a sulfuric acid solution of titanium, hydrolyzing the said titanium solution to obtain a mixed precipitate of hydrous titanium oxide and barium sulfate, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 850° C. and about 1050° C. for a period of time between about one-half hour and about six hours.

10. Method for the production of improved composite titanium dioxide pigments containing rutile titanium dioxide which comprises reacting an aqueous solution of a water-soluble barium salt with sulfuric acid to form barium sulfate, suspending the barium sulfate thus formed in a sulfuric acid solution of titanium, hydrolyzing the said titanium solution to obtain a mixed precipitate of hydrous titanium oxide and barium sulfate, mixing with the said precipitate a small amount of zinc oxide, and calcining the mixture at temperatures between about 850° C. and about 1050° C. for a period of time between about one-half hour and about six hours.

11. Method for the production of improved composite titanium dioxide pigments containing rutile titanium dioxide which comprises reacting an aqueous solution of a water-soluble barium salt with sulfuric acid to form barium sulfate, suspending the barium sulfate thus formed in a sulfuric acid solution of titanium, the proportions of barium sulfate and titanium solution being such as to yield after calcination a pigment containing between about twenty-five percent and thirty-five percent titanium dioxide and the balance barium sulfate, hydrolyzing the said titanium solution to obtain a mixed precipitate of hydrous titanium oxide and barium sulfate, mixing with the said precipitate a small amount of zinc oxide, and calcining the mixture at temperature between about 850° C. and about 1050° C. for a period of time between about one-half hour and about six hours.

12. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of an inorganic compound selected from the group consisting of compounds having spinel, ilmenite, corundum, sodium chloride and phenacite crystalline characteristics which does not decompose and is non-liquefiable and non-volatile at the temperature of the subsequent calcination, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

13. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of an inorganic compound having spinel crystalline characteristics which does not decompose and is non-liquefiable and non-volatile at the temperature of the subsequent calcination, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

14. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of a zinc titanate, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

15. Method for the production of improved composite titanium dioxide pigments containing rutile titanium dioxide which comprises suspending particles of an extender pigment in a sulfuric acid solution of titanium, hydrolyzing the said titanium solution to obtain a mixed precipitate of hydrous titanium oxide and extender, mixing with the said precipitate a small amount of zinc oxide, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

16. Method for the production of pigmentary rutile titanium dioxide which comprises suspending particles of pigmentary calcium sulfate in a sulfuric acid solution of titanium, hydrolyzing the said titanium solution to obtain a mixed precipitate of hydrous titanium oxide and calcium sulfate, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved, and washing the composite pigment thus formed with water until the calcium sulfate is substantially completely removed.

17. Method for the production of composite titanium dioxide pigment which comprises suspending particles of calcium sulfate and pigmentary barium sulfate in a sulfuric acid solution of titanium, hydrolyzing the said titanium solution to obtain a mixed precipitate of hydrous titanium oxide, calcium sulfate and barium sulfate, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved.

18. Method for the production of improved composite titanium dioxide pigments, containing rutile titanium dioxide which comprises suspending particles of pigmentary calcium sulfate and pigmentary barium sulfate in a sulfuric acid solution of titanium, hydrolyzing the said titanium solution to obtain a mixed precipitate of hydrous titanium oxide and calcium sulfate, mixing with the said precipitate a small amount of an inorganic compound selected from the group consisting of compounds having spinel, ilmenite, corundum, sodium chloride and phenacite crystalline characteristics which does not decompose and is non-liquefiable at the temperature of the subsequent calcination to rutile titanium dioxide, and calcining the mixture at temperatures between about 775° C. and about 1100° C. until by X-ray examination the presence of a substantial amount of rutile titanium dioxide can be detected in the resultant pigment and the tinting strength and chalk resistant properties thereof are improved, and washing the composite pigment thus formed with water until the calcium sulfate is substantially completely removed.

19. As a new composition of matter, a composite pigment comprising particles of rutile titanium dioxide coalesced with particles of calcium sulfate, the titanium dioxide particles constituting about 30 percent by weight of said composite pigment prepared according to the method of claim 7 and possessing a tinting strength value, as determined by the Reynolds method, between about 540 and about 620 and improved resistance to chalking.

20. As a new composition of matter, a composite pigment comprising particles of rutile titanium dioxide coalesced with particles of extender pigment, the titanium dioxide particles constituting between about 10 per cent and about 50 per cent by weight of said composite pigment, prepared according to the method of claim 2 and possessing improved resistance to chalking and enhanced tinting strength.

21. As a new composition of matter, a composite pigment comprising particles of rutile titanium dioxide coalesced with particles of calcium sulfate, the titanium dioxide particles constituting between about 25 per cent and 35 per cent by weight of said composite pigment, prepared according to the method of claim 4 and possessing improved resistance to chalking and enhanced tinting strength.

22. As a new composition of matter, a composite pigment comprising particles of rutile titanium dioxide coalesced with particles of barium sulfate the titanium dioxide particles constituting between about 25 per cent and 35 per cent by weight of said composite pigment, prepared according to the method of claim 8 and possessing improved resistance to chalking and enhanced tinting strength.

FRANKLIN L. KINGSBURY.
WILLIAM B. ANDERSON.
SANDFORD S. COLE.